3,048,578
PYRIMIDO-[4:5-b]-QUINOXALINES AND A PROCESS FOR THEIR MANUFACTURE
Hans Erlenmeyer and Silvio Fallab, Basel, Switzerland, and Peter Hemmerich, Loerrach, Germany, assignors to Ciba Corporation, a corporation of Delaware
No Drawing. Filed Dec. 13, 1957, Ser. No. 702,542
Claims priority, application Switzerland Dec. 18, 1956
10 Claims. (Cl. 260—211.3)

This invention relates to the manufacture of 10-substituted 5-acyl-5:10-dihydro-pyrimido-[4:5-b]-quinoxalines having a nucleus of the formula

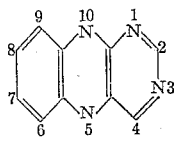

or its tautomeric forms, and also provides a new process for the manufacture of the corresponding 5-unsubstituted compounds and, when desired, their dehydro-derivatives. As substituent in 10-position the compounds produced according to the process of the invention contain primarily a lower alkyl or hydroxyalkyl group, such as a methyl or ribityl group; as acyl residues are primarily concerned those of low aliphatic carboxylic acids, such as propionic acid, preferably of acetic acid, or acyl residues capable of being split hydrogenolytically, such as the carbobenzoxy residue. The compounds can be substituted in the benzene ring and can, for example, also contain condensed aromatic rings; there may be especially mentioned the compounds substituted in 7- and 8-positions by methyl groups. The pyrimido-quinoxalines produced according to the invention preferably contain substituents in 2- and/or 4-position, primarily free or substituted, such as etherified hydroxyl groups, for example lower alkoxy, e.g. methoxy, or halogen atoms, such as chlorine or bromine, or free or etherified mercapto groups, such as methyl mercapto, or free or substituted amino groups.

It has been ascertained that the functional groups in 2- and 4-position of lumiflavine (2:10-dihydro-2-oxo-4-hydroxy -7:8:10 - trimethyl - pyrimido - [4:5 - b] - quinoxaline) of the formula

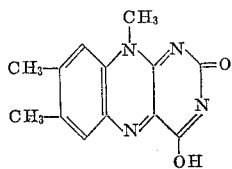

are not reactive. It was also not possible hitherto to convert lumiflavine into a stable dihydro-product and to investigate in the case of such a material the possibility of reactions at the functional groups in 2- and 4-position. It is known that lumiflavine yields a dihydro-derivative with reducing agents. On account of its ready capacity for oxidation to the starting material, this substance has, however, never been isolated and it has not been possible to carry out reactions therewith.

According to the present invention, stable compounds of the 5:10-dihydro-pyrimido-[4:5-b]-quinoxaline series can be obtained when 10-substituted dihydro-pyrimido-[4:5-b]-quinoxalines, which contain in 2- or 4-position a doubly bound reducible substituent, or their tautomeric forms, are reduced in the presence of acylating agents, as starting materials can be used, for example, lumiflavine, 2-thiono-lumiflavine, and 2-imino-lumiflavine. The reduction is preferably carried out in the presence of acylating agents, such as acetic anhydride, propionic anhydride and the like and with nascent hydrogen or catalytically activated hydrogen, as for example hydrogen in the presence of a platinum or palladium catalyst. Especially suitable is zinc in the presence of acetic acid and acetic anhydride. According to the selection of the starting materials and of the reducing agent there are thereby produced the corresponding 5-acyl-5:10-dihydro compounds in which hydrogen is attached to the doubly bound reducible substituents. In the case of lumiflavine, for example, the reaction can be illustrated as follows:

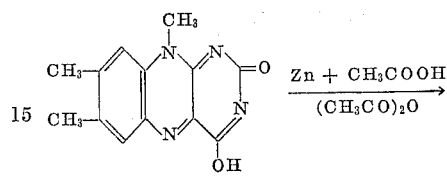

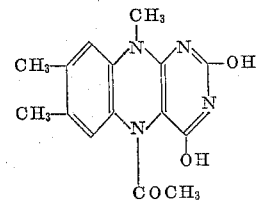

The resulting 5-acyl-5:10-dihydro-pyrimido-[4:5-b]-quinoxalines are new. As described in more detail below, they possess valuable pharmacological properties. The surprising observation has also been made that in these compounds functional groups present in 2- and/or 4-position can be replaced in a simple manner, known per se, so that the compounds can also be used as valuable intermediate products.

Thus free hydroxyl groups can be replaced by halogen, such as chlorine, for example by treatment with halogenating agents, such as thionyl chloride or halides of phosphoric acid, for example phosphorus trichloride or phosphorus oxychloride. Halogen atoms, such as chlorine atoms, can be replaced, by reaction with alcoholates or metal compounds of hydrogen sulphide or mercaptans, by substituted hydroxyl or free or substituted mercapto groups; halogen atoms or free or etherified mercapto groups can be converted by reaction with amines into free or substituted amino groups; finally thio or thiono groups can be desulphurised to hydroxyl or oxo groups or replaced by hydrogen. Chlorine atoms can be replaced by hydrogen in the customary manner, for example, by treatment with metal amalgams, such as sodium amalgam or catalytically.

Furthermore, in the resulting compounds, ring nitrogen atoms of the pyrimidine ring having hydrogen attached thereto can be substituted in the customary manner, for example by alkyl radicals such as methyl, preferably by treatment with reactive esters of the corresponding alcohols, e.g. alkyl halides, dialkyl sulphates or aryl sulphonic acid alkyl esters.

It has further been shown that the compounds obtained by the above described processes, either directly or after conversion of substituents, when they contain an oxidizable hydrogen atom in the pyrimidine ring, can easily be converted into the corresponding dehydrogenated 5- unsubstituted compounds by treatment with deacylating agents, for example hydrolysing or hydrogenating agents, for example, dilute mineral acids, in the presence of oxidizing agents. As oxidizing agent air oxygen often suffices, so that the addition of oxidizing substances is not necessary. Should it be necessary to use another oxidizing agent, for example ferricyanides, per-acids, hydrogen peroxide, ferric salts and the like can be used.

The invention is thus seen to include a new, multi-stage process for the manufacture of corresponding compounds of the 2:10- or 4:10-dihydro-pyrimido-[4:5-b]-quinoxaline series. Of this series hitherto only lumiflavin I, 2-thiono-lumiflavine II and 2-imino-lumiflavine III were known.

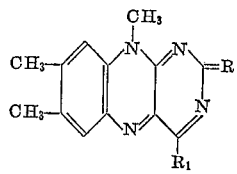

or

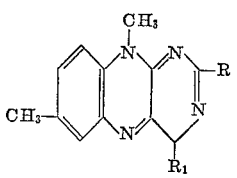

(I) R=O; $R_1$=OH
(II) R=S; $R_1$=OH
(III) R=NH; $R_1$=OH
(IV) R=OH; $R_1$=S
(V) R=H; $R_1$=O

It is now possible, starting for example from these known compounds, by acylating reduction, conversion of the functional groups, cleavage of the acyl group with subsequent oxidation, to obtain new compounds of the specified type, for example 5-unsubstituted 10-substituted 2-R-4-$R_1$-2:10-dihydro-pyrimido - [4:5-b] - quinoxalines, in which R stands for an oxo, imino or thiono group and $R_1$ indicates a radical different from a free hydroxyl group, for example hydrogen, a free or etherified mercapto group or a free or substituted amino group or a substituted hydroxyl group, and also their tautomeric forms, and also 5-unsubstituted 10-substituted 4:10-dihydro-pyrimido-[4:5-b]-quinoxalines, having in 4-position an oxo, thiono or imino group. Such new compound include, for example, 4-thiono-lumiflavine IV, and 2-desoxylumiflavine V.

In general the new process is suitable for the manufacture of 10-substituted 1:5-unsubstituted dihydropyrimido-[4:5-b]-quinoxalines, which contain in the pyrimidine ring at least one double bond and an oxo, imino or thiono group.

However, the invention also extends to a modification of this process, according to which the reduction process of this invention does not take place in the presence of acylating agents but of such agents as convert substituents present or produced in 2- and/or 4-position and which are convertible in the reduced molecule. In this case the reducing agent can also simultaneously exert the function of the conversion agent. Thus, for example, lumiflavine can be reduced by treatment with phosphorus pentasulfide, as a result of which replacement of the 4-hydroxyl group by the thio group takes place, so that after oxidation according to the process of the invention 4-thio-lumiflavine is obtained.

Summarizing, therefore, the new process consists in that the starting materials are treated with reducing and acylating agents, the resulting 5-acyl compounds, if desired, treated with N-substituting agents and/or with agents converting substituents in 2-and/or 4-position and, if desired deacylating agents and, if desired oxidizing agents reacted upon the resulting products or the starting materials are treated with reducing agents and simultaneously with such agents as convert substituents present or produced in 2-and/or 4-position and, if desired, the resulting products are reacted with oxidizing agents. As stated above, the reducing and acylating agents can be used simultaneously, or the reducing agents may simultaneously have a conversion effect.

The new compounds produced according to the invention possess valuable pharmacological properties. They also possess bacteriostatic properties, especially against gram-positive bacteria, such as streptococci. The new compounds are intended for use as medicaments or as intermediate products for the manufacture thereof.

They can be used as medicaments for example in the form of pharmaceutical preparations. These contain the specified compounds in admixture with a pharmaceutical organic or inorganic carrier material suitable for enteral, parenteral or local administration. As such can be used substances that do not react with the described compounds, for example gelatine, lactose, starch, magnesium stearate, talc, vegetable oils, benzyl alcohols, gums, polyalkylene glycols, petroleum jelly, cholesterol or other known medicament carriers. The pharmaceutical preparations can be, for example, in the form of tablets, dragees, salves, creams or in liquid form as solutions, suspensions or emulsions. If desired they are sterilized and/or contain auxiliary substances such as preserving, stabilizing, wetting or emulsifying agents. They can also contain other therapeutically valuable substances. The preparations can be obtained by customary methods.

According to the nature of the substituents, the compounds obtained according to the present invention can exist in free form or as salts with metals or acids: more particularly pharmaceutically acceptable salts are intended. As metals alkali or alkaline earth metals should primarily be mentioned and as acids, organic acids or more especially inorganic acids, such as hydrohalic, sulfuric or phosphoric acids or nitric acid.

Some of the compounds used as starting materials are known, for example lumiflavine, 2-thiono-lumiflavine and 2-lumiflavimine. Other compounds of this type are available by the process of the invention and when obtained can themselves be used as starting materials for this process.

The invention also comprises any modification of the process in which a product obtainable as an intermediate at any stage in the process is used as starting material and the remaining step or steps are carried out, or in which the process is interrupted at any stage.

The following examples illustrate the invention:

*Example 1*

Into a boiling suspension of 0.5 gram of 7:8:10-trimethyl - 2 - oxo - 4 - hydroxy - 2:10 - dihydro - pyrimido-[4:5-b]-quinoxaline in 20 cc. of an acetylation mixture (consisting of acetic anhydride:acetic acid:sulfuric acid =50:50:1), zinc dust is slowly introduced until the decolorization is permanent. Since the metal is rapidly deactivated, an excess must be added in small portions. As a result the lumiflavine gradually passes completely into solution, a deep red semi-quinone is first formed, then the colorless 7:8:10-trimethyl-5-acetyl-2:4-dihydroxy-5:10-dihydro - pyrimido - [4:5-b]-quinoxaline. When the supernatant solution just remains bright yellow, the whole is filtered rapidly while at boiling temperature through a glass frit, well washed with hot acetic acid and the filtrate evaporated under vacuum. The syrupy, bright yellow residue is taken up in 50 cc. of N-sodium acetate solution. After shaking for a short time, a micro-crystalline precipitate is deposited. The product is allowed to settle at 0° C. for some hours and filtered.

The cream colored residue is dissolved in N-aqueous ammonia and the solution shaken with animal charcoal and, after filtration, neutralized with 2 N-acetic acid. The 7:8:10 - trimethyl - 5 - acetyl - 2:4 - dihydroxy - 5:10-dihydro-pyrimido[4:5-b]-quinoxaline is deposited in colorless small rods arranged in the form of stars. Yield 0.45 gram equals 77% of the theoretical yield. The substance has no characteristic melting point. At about 280° C. slow dehydrogenating acetolysis with splitting off of acetic acid commences with formation of 7:8:10-trimethyl - 2 - oxo - 4 - hydroxy - 2:10 - dihydro - pyrimido-[4:5 - b] - quinoxaline. Complete decomposition takes place at 320° C.

Example 2

5 grams of crude, red-brown 7:8:10-trimethyl-2-thiono-4-hydroxy-2:10-dihydro-pyrimido-[4:5-b]-quinoxaline are heated to boiling in 50 cc. of a mixture of equal parts of acetic acid and acetic anhydride and zinc dust is slowly introduced until the color of the suspension has changed from deep violet to light brown. In this process, the starting material for the most part passes into solution with decolorization. After further boiling for 5 minutes, a voluminous light brownish precipitate is formed. Filtration is carried out with cooling and the residue is dissolved in N-caustic soda solution. Together with unconsumed zinc dust only a little zinc sulfide remains undissolved. After decolorization of the filtrate with charcoal it is treated at room temperature with N-hydrochloric acid and after the precipitate has been allowed to settle for several hours at 0° C. it is filtered off. After reprecipitation once from N-caustic soda solution and once from 2 N-aqueous ammonia, 7:8:10-trimethyl-5-acetyl-2-thio-4-hydroxy-5:10-dihydro-pyrimido-[4:5-b]-quinoxaline is obtained as a cream colored amorphous substance. At about 220° C., with partial decomposition and splitting off of acetic acid it is converted into 7:8:10-trimethyl-2-thiono-4-hydroxy-2:10-dihydro-pyrimido-[4:5-b]-quinoxaline which itself begins to melt at 263° C. with decomposition.

Example 3

7:8:10-trimethyl-5-acetyl-2-thio-4-hydroxy-5:10-dihydro-pyrimido-[4:5-b]-quinoxaline is dissolved in N-caustic soda solution and treated four times slowly with shaking with dimethyl sulfate to a neutral reaction to Congo red paper, the alkali consumed on each occasion being replaced. Finally, on addition of alkali, only a little of the substance passes into solution. The alkaline suspension is then filtered and the residue washed well with N-caustic soda solution and water and crystallized twice from ethanol. The resulting 3:7:8:10-tetramethyl-5-acetyl-2-methylmercapto-4-oxo-3:4:5:10-tetrahydro-pyrimido-[4:5-b]-quinoxaline forms fine, colorless small rods with oblique shaped ends, which decompose slightly at the melting point of 268–272° C.

The alkaline filtrate gives with 2 N-acetic acid a granular, partly crystalline, cream colored precipitate which cannot be crystallized from alcohol. This is 7:8:10-trimethyl-5-acetyl-2-methylmercapto-4-hydroxy-5:10-dihydropyrimido-[4:5-b]-quinoxaline.

3:7:8:10-tetramethyl-5-acetyl-2-methylmercapto-4-oxo-3:4:5:10-tetrahydro-pyrimido-[4:5-b]-quinoxaline can be converted as follows into 3:7:8:10-tetramethyl-2:4-dioxo-2:3:4:10-tetrahydro-pyrimido-[4:5-b]-quinoxaline.

30 mg. of 3:7:8:10-tetramethyl-5-acetyl-2-methylmercapto-4-oxo-3:4:5:10-tetrahydro-pyrimido-[4:5-b]-quinoxaline are gently heated in 4 N-hydrochloric acid for 10 minutes on the water bath with addition of a few drops of 30% hydrogen peroxide. The solution acquires a transient violet color and becomes finally yellow. It is now buffered with saturated aqueous sodium acetate solution, whereby an intensive green fluorescence is produced. The resulting 3:7:8:10-tetramethyl-2:4-dioxo-2:3:4:10-tetrahydro-pyrimido-[4:5-b]-quinoxaline can be extracted from the solution with chloroform.

Example 4

0.1 gram of crude 7:8:10-trimethyl-5-acetyl-2-thio-4-hydroxy-5:10-dihydro-pyrimido-[4:5-b]-quinoxaline is dissolved in a slight excess of N-aqueous ammonia and heated to boiling for 1 hour with about 0.5 gram of fresh Raney nickel W-6. After filtration and neutralization with acetic acid, evaporation under vacuum is carried out to the commencement of crystallization. In this manner 7:8:10-trimethyl-5-acetyl-4-hydroxy-5:10-dihydro-pyrimido-[4:5-b]-quinoxaline is obtained in beautiful, pale cream colored small rods arranged in clusters. For purification, the product is again dissolved in a little aqueous ammonia, treated with charcoal and reprecipitated with acetic acid.

Example 5

30 mg. of 7:8:10-trimethyl-5-acetyl-4-hydroxy-5:10-dihydro-pyrimido-[4:5-b]-quinoxaline are gently heated in 4 N-hydrochloric acid for 10 minutes on the water bath. An intensive violet coloration is immediately produced. From the red-orange solution having a slight blue-green fluorescence, produced by buffering with saturated aqueous sodium acetate solution, 7:8:10-trimethyl-4-oxo-4:10-dihydro-pyrimido-[4:5-b]-quinoxaline can be extracted with chloroform.

7:8:10-trimethyl-4-oxo-4:10-dihydro-pyrimido-[4:5-b]-quinoxaline is more basic than 7:8:10-trimethyl-2-oxo-4-hydroxy-2:10-dihydro-pyrimido-[4:5-b]-quinoxaline and cannot be extracted from dilute mineral acid solution with chloroform. In an alkaline medium it is almost instantaneously destroyed, the solution becoming light colored. In dilute acetic acid solution it is slowly oxidized by hydrogen peroxide in the cold, rapidly in the hot, the solution becoming light colored with an intensive bright yellow-green fluorescence, with the formation of chromatographically pure 7:8:10-trimethyl-2-oxo-4-hydroxy-2:10-dihydro-pyrimido-[4:5-b]-quinoxaline. In acetic acid solution, 7:8:10-trimethyl-4-oxo-4:10-dihydro-pyrimido-[4:5-b]-quinoxaline is stable for a prolonged period.

Example 6

2 grams of commercial phosphorus pentasulfide are boiled with active charcoal in 40 cc. of absolute pyridine and the solution rapidly filtered with suction through a fritted glass plate directly into a sulfonating flask. 0.3 gram of 7:8:10-trimethyl-2-oxo-4-hydroxy-2:10-dihydro-pyrimido-[4:5-b]-quinoxaline is introduced and the whole stirred for 2 hours at boiling temperature under a nitrogen atmosphere. The fluorescence disappears gradually and the initially yellow green solution becomes light brown. The solvent is then distilled off as far as possible under vacuum. The smeary residue, on the slightest access of air, immediately becomes deep brown colored. It is treated with ice cold 2 N-hydrochloric acid. The solid compound thus produced is allowed to settle for some time at 0° C. with the exclusion of air, then filtered with suction rapidly on a fritted glass plate and washed well with water, methanol and acetone. For purification it is dissolved in a little N-caustic soda solution, a little "Celite" added and the whole filtered and washed well with water. The deep red alkaline filtrate must be protected from air as far as possible. It is neutralized rapidly to Congo red with dilute hydrochloric acid, whereby a flocculent violet precipitate is produced. The suspension is extracted repeatedly with chloroform until the extract is only slightly reddish colored. The deep violet chloroform solution is immediately dried over sodium sulfate and concentrated under vacuum at room temperature until crystallization commences. On standing over-night at −10° C., 7:8:10-trimethyl-2-oxo-4-thio-2:10-dihydro-pyrimido-[4:5-b]-quinoxaline separates out in the form of violet brown, irregular, lustrous small crystals which are filtered with suction, washed with absolute ether and dried.

In neutral solution, this compound is less sensitive to air than 7:8:10-trimethyl-2-thiono-4-hydroxy-2:10-dihydro-pyrimido-[4:5-b]-quinoxaline but it reacts immediately with peroxides with oxidative elimination of sulfur to form 7:8:10-trimethyl-2-oxo-4-hydroxy-2:10-dihydro-pyrimido-[4:5-b]-quinoxaline. It is of fairly good solubility in chloroform with a violet color, only slightly soluble in water with a red orange color and soluble in dilute alkali with a deep carmine red color.

Example 7

1 gram of riboflavine (vitamin $B_2$ Ph.H.V. purum, 7:8 dimethyl-10-(d:1'-ribityl)-2-oxo-4-hydroxy - 2:10 - dihydro-pyrimido[4:5-b]quinoxaline) is suspended in 30 cc. of a mixture of equal parts of glacial acetic acid and acetic anhydride. Zinc dust is introduced in small portions into the boiling reaction mixture until, after a few minutes, nearly all of the dyestuff is dissolved, the color becoming much lighter and fluorescence disappearing. About 0.5 gram of zinc is required. The reaction mixture is then heated for another 5 minutes with the addition of animal charcoal, and the boiling hot mixture is filtered through a pre-heated glass frit. The pale yellow filtrate is evaporated under reduced pressure to dryness, taken up with a little alcohol, and the leucoflavine precipitated by the addition of ether. The crude yield of cream colored, amorphous acetyl-leuco-riboflavine (7:8-dimethyl-10-ribityl-5-acetyl - 2:4 - dihydroxy - 5:10 - dihydropyrimido[4:5-b]quinoxaline) is 1.5 grams=86%. The product contains about 1 equivalent of free acetic acid. In contrast to the free riboflavine it is readily soluble in water, alcohol, chloroform and glacial acetic acid. It reacts with diazomethane with liberation of 2 equivalents of nitrogen. For the purpose of analysis, it is recrystallized several times from a mixture of alcohol and ether. It melts unsharply at 155° C. with decomposition. After drying for 12 hours at 20° C. under 0.01 mm. of pressure, it still contains ½ mol of acetic acid which can be removed by further drying for 12 hours at 110° C. under 0.01 mm. of pressure.

What is claimed is:

1. 7:8-dimethyl-10-ribityl-5-acetyl-2:4-dihydroxy-5:10-dihydro-pyrimido-[4:5-b]-quinoxaline.
2. 7:8:10 - trimethyl - 5 - acetyl-2:4-dihydroxy-5:10-dihydro-primido-[4:5-b]-quinoxaline.
3. 7:8:10-trimethyl-5-acetyl-2-thio-4-hydroxy-5 : 10-dihydro-pyrimido-[4:5-b]-quinoxaline.
4. 7:8:10-trimethyl - 5 - acetyl-2-methylmercapto-4-hydroxy-5:10-dihydro-pyrimido-[4:5b]-quinoxaline.
5. 7:8:10 - trimethyl-5-acetyl-4-hydroxy-5:10-dihydropyrimido-[4:5-b]-quinoxaline.
6. Process for the manufacture of 5:10-dihydropyrimido-[4:5-b]-quinoxalines which comprises contacting a member selected from the group consisting of 4-hydroxy - 7:8-dimethyl - 2:10-dihydro-pyrimido-[4:5-b]-quinoxaline of the formula

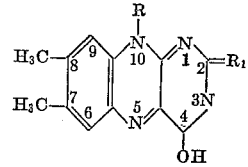

wherein R represents a member selected from the group consisting of lower alkyl and ribityl and $R_1$ a member selected from the group consisting of oxo, thiono and imino, and its tautomeric forms, with a reducing agent selected from the group consisting of catalytically activated hydrogen and nascent hydrogen in the presence of an acylating derivative of a lower alkanoic acid.

7. A member selected from the group consisting of 4-hydroxy - 5 - lower alkanoyl-7:8-dimethyl-5:10-dihydropyrimido-[4:5-b]-quinoxaline of the formula

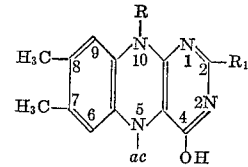

wherein R represents a member selected from the group consisting of lower alkyl and ribityl, $R_1$ a member selected from the group consisting of hydroxy, mercapto and amino and $ac$ stands for lower alkanoyl, and its tautomeric forms.

8. A process according to claim 6, wherein the pyrimido-[4:5-b]-quinoxaline used as starting material is reduced with zinc and acetic acid in the presence of acetic acid anhydride.

9. A process according to claim 6 wherein the 5:10-dihydro-[4:5-b]-quinoxaline obtained is methylated by treatment with a member selected from the group consisting of a methyl halide, methyl sulfate and aryl sulfonic acid methyl ester.

10. A process according to claim 6 wherein the 2-thio-5:10 - dihydro - [4:5-b]-quinoxaline obtained is treated with aqueous ammonia in the presence of a nickel catalyst to yield the corresponding 2-desulfurized compound.

References Cited in the file of this patent

UNITED STATES PATENTS

| | | |
|---|---|---|
| 2,472,007 | Farkas et al. | May 31, 1949 |
| 2,561,324 | De Garmo | July 24, 1951 |
| 2,603,532 | Weidenheimer et al. | July 15, 1952 |
| 2,710,866 | Carrara et al. | June 14, 1955 |
| 2,719,157 | Uyeo et al. | Sept. 27, 1955 |
| 2,766,241 | Petering | Oct. 9, 1956 |

OTHER REFERENCES

Houben: Die Methoden der Organischen Chemie, vol. 2, page 237 (1925).

Robinson et al.: Jour. Chem. Soc. (London), 1935, pp. 467–470.

Karrer: Organic Chemistry (1938), pages 101, 188 and 198.

Gowenlock et al.: Jour. Chem. Soc. (London), 1948, pp. 517–519.

Kavanagh et al.: Archives of Biochemistry, vol. 20, pp. 317 (1949).

Kosolapoff: Organophosphorous Compounds (1950), page 236.